(12) United States Patent
Hahn et al.

(10) Patent No.: US 6,767,945 B2
(45) Date of Patent: Jul. 27, 2004

(54) TIRE SIDEWALL COMPOSITION

(75) Inventors: Bruce Raymond Hahn, Hudson, OH (US); Ramendra Nath Majumdar, Hudson, OH (US)

(73) Assignee: The Goodyear Tire & Rubber Company, Akron, OH (US)

( * ) Notice: Subject to any disclaimer, the term of this patent is extended or adjusted under 35 U.S.C. 154(b) by 0 days.

(21) Appl. No.: 10/328,200

(22) Filed: Dec. 23, 2002

(65) Prior Publication Data

US 2004/0122140 A1 Jun. 24, 2004

(51) Int. Cl.[7] .................................................. C08K 5/05
(52) U.S. Cl. ..................... 524/187; 524/247; 524/575.5
(58) Field of Search .................................. 524/247, 187, 524/575.5

(56) References Cited

U.S. PATENT DOCUMENTS 4,111,867 A  *  9/1978  Komuro et al. ............. 524/496
5,066,721 A       11/1991  Hamada et al.
5,239,023 A  *   8/1993  Hsu et al. .................... 526/141

* cited by examiner

Primary Examiner—Margaret G. Moore
(74) Attorney, Agent, or Firm—Bruce J. Hendricks; Alfred D. Lobo; Henry C. Young, Jr.

(57) ABSTRACT

A black rubber sidewall compound essentially free of a silanated rubber which includes a combination of less than 10 phr of a rosin acid type "tackifier" and less than 1 phr of a t-alkanolamine generates, upon curing against a metal mold surface having a finish in the range from about 8 RA to 32 RA, a reaction product which, at the surface of the sidewall, has a gloss in the range from about 10 to 40 lasting at least one month. A secondary advantage is that the surface of the mold remains clean enough not to require refurbishing through at least 20% more curing cycles than is possible with a sidewall conventional sidewall compound without the specified tackifier and t-alkanolamine. Multiple washing of the sidewalls during a month of using the tire, fails to diminish the gloss substantially.

13 Claims, 1 Drawing Sheet

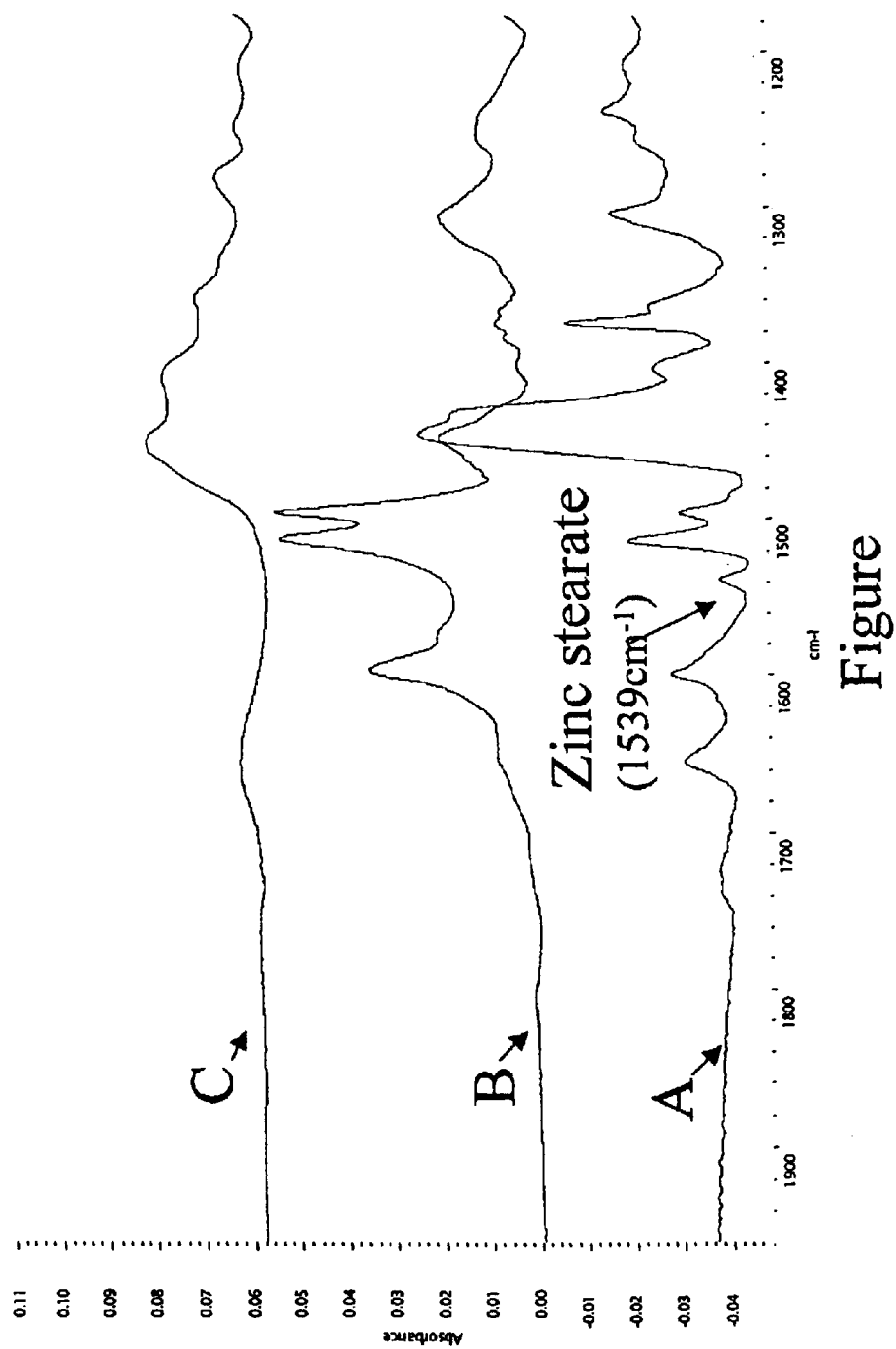

TIRE SIDEWALL COMPOSITION

FIELD OF THE INVENTION

A green tire reinforced with carbon black is provided with a sidewall composition which upon being cured presents a glossy or shiny black surface. The terms "glossy" and "shiny" are equivalent terms used interchangeably herein, each being measured by reflectivity in a meter designed for the purpose, such as an Erichsen Pico Glossmeter Model 500. Known sidewall compositions comprising an unsaturated rubber, whether predominantly synthetic or natural (1,4-cis polyisoprene) rubber, suffer from weathering due to exposure to atmospheric conditions, including exposure to UV (ultraviolet) light, ozone and high humidity. Such exposure results in fatigue cracking due to continual flexing of the tire sidewall under operating conditions. It is desirable to maintain a cosmetically pleasing appearance of the sidewall without sacrificing the performance characteristics of the sidewall compound.

BACKGROUND OF THE INVENTION

Tire appearance is a major factor in influencing a customer's perception of tire quality and results in purchase of the tire by the customer. Pneumatic rubber tires mounted on wheel rims of a vehicle are visually appraised, typically, only in an elevational view which presents the tires' sidewalls. In the competition for visual attention, the wheel rim easily wins. However, granted the arresting design of a state-of-the-art wheel rim, the drab, dull grey-black appearance of the sidewall denigrates the visual impact of the wheel; it becomes a detrimental distraction and a problem to be coped with, first, when the tire is sold in a salesroom, and then, by the customer who purchased the tire.

A typical mold which is used to cure tires continuously to produce approximately 100 tires during a 24 hr period, is refurbished, that is cleaned and refinished to remove fouling, after about 1500 cures. The period over which tires are produced without having to clean the mold's sidewall surfaces is referred to as a "clean run". The "polish" or "finish" at the beginning of a clean run, and the ability of the mold's surface to combat fouling determines, to a large extent, the length of a clean run. To at least the same, if not a greater extent, the length of a clean run is determined by the chemical interaction of ingredients in the sidewall compound. An extension of the clean run of only 10% is economically significant and a greater extension is of major significance.

An uncured sidewall surface of a typical green passenger tire has a gloss no higher than 10; a typical truck tire has an even lower gloss. Over a typical number of curing cycles ("cures") in a mold, sidewalls have an average gloss lower than 10, typically in the range from about 1 to 6. If refurbished to minimize fouling, a hard smooth chromed surface on a sidewall mold produces a gloss in the range from about 5–15, with a polished surface giving a higher gloss up to about 50 with a 8-microfinish, but upon exposure outdoors over a period of one month, the gloss falls to 5 or less.

To date, one generally copes with the problem by coating the sidewall with a thin protective film, whether liquid or solid, of a glossy compound, e.g. a silicone-containing fluid sprayed or wiped onto a dry and clean sidewall; or a film of polymer such as a waterborne polyurethane or polyepoxide as disclosed in U.S. Pat. No. 6,093,271 to Majumdar, and in WO 01/94453 A1 to Cottin et al.; or by coating with a polyepoxide. Because all sidewalls are subjected to sunlight and oxidation, exposure to ultraviolet light, ozone and high humidity robs black sidewalls of such gloss as they may have had when freshly cured. Continuous distortion under normal operating conditions (of tires), causes high stress and results in fatigue cracking. Abrasion against curbs on paved roads and gravel and stones in unpaved roads, greatly shortens the period of its effectiveness of any coating. Moreover, sidewalls of tires operated on dry pavement quickly acquire a coating of road grime; when run on wet roads, as they are expected to be, they are also coated with mud, in either case requiring repetitive cleaning. Such cleaning damages any thin protective film. Hard experience teaches that the gloss attributable to coatings, to date, is short-lived, lasting less than a month in an outdoor environment. Nevertheless, assuming a coating is highly effective for the purpose, applying the coating is an additional step which the invention disclosed herein now makes unnecessary.

Still another approach to providing a cosmetically enhanced sidewall is to dress up a black sidewall with a band of decorative white rubber, its color due to being heavily reinforced with a light-colored inorganic pigment such as titanium dioxide or calcium carbonate. In addition, or as an alternative, white or palc rubber appliques, whether logos or trade names, are applied to the sidewall to advertise a car owner's choice of a manufacturer. However, despite the additional expense, the impact of such cosmetic improvements is also relatively short-lived because colored rubber sidewalls and appliques, whether light-colored or dark, are difficult to keep clean, particularly if white, not only because of road grime and mud unavoidably applied exteriorly from the environment, but also because of well-known staining due to conventionally used ingredients of a black sidewall compound, which ingredients include processing oils, antiozonants, antioxidants, zinc oxide and other ingredients in a typical recipe.

Numerous prior art references are directed to sidewall compositions which improve the performance of the sidewall with little or no regard as to what the reflectivity of the sidewall might be, and no suggestion that the glossy or shiny visual appearance of the sidewall, one way or another, might be affected in any way. For example, U.S. Pat. No. 5,066,721 to Hamada et al discloses a silane compound-modified rubbery polymer ("silanated rubber") which may be blended in an amount not less than 10% by weight, with a conventional rubber compound to allow the blend to incorporate from 5 to 90 parts of silica per 100 parts of reinforcement, the remaining reinforcement being carbon black. The effectiveness of the silica is attributed to a silane coupling agent and the silanated rubber in the blend. In a typical recipe (see col 11, lines 33–45) 100 parts by weight of a silane compound-modified rubber (see col 11, line 20) contains 40 phr of silica and 1.5 phr of trioethanolamine. Though the function of the triethanolamine is unstated, it appears to be as a condensation catalyst or an accelerator for the silane coupling agent, and as such it is unclear whether the triethanolamine survives in the cured compound. Such a high level of a tertiary alkanolamine ("t-alkanolamine") such as triethanolamine deleteriously affects the physical properties, particularly the tear strength, of a typical black sidewall compound which contains at least 30 phr of carbon black. A conventional black sidewall compound blended with at least 10 phr of silanated rubber is distinct from a typical black sidewall compound in which, when cured, the t-alkanolamine is reacted with one or more of the ingredients in the sidewall recipe leaving no evidence of the t-alkanolamine originally present. Moreover, a preferred black sidewall compound contains less than 10 parts of silanated rubber per 100 parts, preferably, essentially no silanated rubber.

Several other references refer to shiny sidewalls on cured tires but fail to state what criterion was used to determine that the sidewall was "shiny" or whether the shine lasts for any substantial length of time after the tire is removed from the mold, or whether the shine, whatever its original level, can be maintained after exposure to sunlight, and/or to multiple washings with soap and water.

A shiny sidewall is most readily provided by using a highly polished mold surface in contact with the sidewall. To produce a significant number of tires in such a mold, its polished surface must resist fouling. Efforts to do this have produced fouling-resistant coatings on the polished mold surfaces. This invention is concerned with an ingredient which concurrently modifies the sidewall composition and minimizes fouling the surface of the mold.

The Multi-faceted Problem:

It is well known that a highly polished mold surface in contact with a cured sidewall of a black tire results in a shiny sidewall, assuming the use of a release agent which is readily cleaned off the cured surface of the sidewall. The better the microfinish of the surface of the mold, the higher the "gloss" or "shine". But the gloss lasts less than a month after a cured tire is removed from the curing mold, having been reduced to a dull black by the time the tire is removed from a dealer's inventory and sold to a customer, typically a longer period under the best of conditions. Restoring the shine by the application of shine-generating fluids does not provide a long-term "fix" because such a fix typically lasts a week or less, depending upon the exposure of the tire to sun, rain and other "road elements".

If the tire is cured in a mold in which the sidewall surfaces are microfinished to mirror-like quality, a freshly cured tire, immediately transported to a salesroom, retains too high a gloss, that is, a glossmeter reading higher than 50. Such a high gloss is deemed objectionable by a typical customer as the gloss, relative to a preferred gloss range, lacks "jet blackness" and therefore appears "unusual". The goal therefore, is to provide a composition for black sidewalls, irrespective of the ingredients of typically carbon black-reinforced rubber compounds for sidewalls, in which black sidewalls the gloss is modulated in a desired range of from about 10 to 40 by the result of a chemical reaction in a curable compound rather than a coating on the cured compound. With a combination of ingredients in the curable compound, sidewalls are to be produced having gloss in the desired range; moreover, such a gloss is to last several weeks even when exposed to sunlight; and when muddied, the gloss can be substantially restored by washing and scrubbing with soap and water.

Addressing the Problem:

After having recognized that a shiny sidewall on a tire emerging from a smooth-surfaced curing mold deteriorates mainly due to chemical interaction of ingredients in the cured sidewall, it was determined that zinc stearate, zinc sulfide (byproducts of reactions during vulcanization), antiozonants, antioxidants and processing oils are mainly responsible for such deterioration. In particular, commonly used antiozonants such as paraphenylenediamine, used to provide protection against attack by ozone under both static and dynamic conditions, and fatty acids used to provide a sidewall compound with better processing characteristics, are particularly aggressive in their attack on the once-shiny sidewall black surface which is stained or otherwise reduced to a dull grey-black color. The term "stain" or "staining" is herein used to describe the proclivity of a material to diffuse through a polymeric substrate and discolor its surface, whatever its original color. In black sidewalls, diffusion of paraphenylenediamine to the surface results in a bluish grey, then a dull brown surface which is aesthetically objectionable if one expects a glossy jet black smooth appearance, such as is reasonably expected in a new black sidewall tire. Moreover, the dull grey or brown surface discoloration is difficult to remove by routine cleaning with soap and water.

SUMMARY OF THE INVENTION

Modification of a black rubber sidewall compound by the addition of a combination of less than 10 phr of a "tackifier" and less than 1 phr of a t-(lower)-alkanolamine (2,2,2,-nitrilotrisalkanol) generates, upon curing, a reaction product which, at the surface of the sidewall, produces a gloss in the range from about 10 to 40 lasting at least one month without diminishing the mechanical properties of the sidewall and the operating performance of the tire relative to that of a tire without the added combination. Multiple washing of the sidewalls during the period fails to diminish the gloss substantially.

A curable black rubber sidewall compound essentially free of a silanated rubber, is compounded with a combination of from about 0.1–10 phr of a rosin acid type tackifier, and from 0.05 to less than 1 phr (part per 100 parts of rubber) of a t-$C_1$–$C_5$-alkanolamine, without the addition of a fatty acid. The compound exhibits desirable ozone resistance, heat dissipation and fatigue crack propagation resistance despite containing in the range from about 30 phr to 75 phr of reinforcing filler, the major portion by weight of which is carbon black. The cosmetically pleasing appearance of the sidewall is maintained when the tire is cured in a metal mold which delivers a clean run (the surface of the mold fails to get fouled enough to require refurbishing) which run is at least 20% longer than a clean run with the same black rubber compound without the tackifier and t-alkanolamine.

A curable tire sidewall composition comprises from about 30 phr to 75 phr of reinforcing filler, more than 90% of it being carbon black, and either (i) a blend of highly unsaturated rubbers, e.g. cis-polybutadiene and natural rubber, or (ii) a blend of from about 40 to 60 phr of a highly unsaturated rubber with correspondingly from about 60 phr to 40 phr of one of lesser unsaturation, in either of which blends (i) or (ii) the only fatty acid(s) is that provided by natural rubber present in a minor amount by weight relative to the other rubbers; and, process- and performance-enhancing ingredients including from 0.1–5 phr of a rosin acid type tackifier, and from about 0.05 phr to 0.75 phr (part per hundred parts by weight of rubber) of the t-alkanolarnine, optionally with from 0.1 to less than 1 phr of a polyalkylene glycol having a molecular weight in the range from about 200 to 1,000, preferably 300 to 600.

A curable sidewall compound is compounded by blending a highly unsaturated rubbery polymer with an elastomer having lesser unsaturation than the highly unsaturated rubbery polymer, process- and performance-enhancing ingredients including from 0.1–3 phr of a rosin acid type tackifier, and from about 0.05 phr to 0.75 phr of a t-alkanolamine, the alkanol having from 1 to 5 carbon atoms.

An ATR-FTIR spectrum indicates that the t-alkanolamine in the uncured rubber is not present in the cured sidewall compound as a result of having reacted at curing temperature and pressure. The overall effect of the reaction product is that it masks the dulling effect of both aromatic processing oils and zinc oxide, both essential ingredients in the recipe for a sidewall.

BRIEF DESCRIPTION OF THE DRAWING

The foregoing and additional objects and advantages of the invention will best be understood by reference to the following detailed description, accompanied with the FIGURE showing three ATR-FTIR spectra recorded with a Nicolet Magna IR 550 spectrometer, in which FIGURE: the spectrum identified as 'A' is generated by a conventional black rubber sidewall compound after a tire is cured, showing a peak at 1539 cm$^{-1}$ attributable to zinc stearate; the spectrum identified as 'B' is generated by a the black rubber sidewall compound of this invention showing that the peak at 1539 cm$^{-1}$ has been eliminated; and, the spectrum identified as 'C' which spectrum is generated by triethanolamine.

DETAILED DESCRIPTION OF PREFERRED EMBODIMENTS

When the novel sidewall composition is extruded into a strip for a sidewall of a tire, it yields an uncured surface having an 60° Erichsen Pico Glossmeter Model 500 reading of less than 5. When a tire is made with a sidewall of the novel compound and is cured in a mold in which the smooth, hard surface in contact with the sidewall, has at least a 32 RA finish, the result is a glossy cured sidewall surface having a reading of about 20–30 as measured with a 60° Erichsen Pico Glossmeter Model 500; and neither the reading nor the jet-blackness of the surface is substantially diminished upon exposure for at least four weeks outdoors, or at least three months indoors. The sidewall may also comprise at least one highly unsaturated rubber, preferably a blend of two or more highly unsaturated rubbers, and from 0 to 60 phr of a halogenated, preferably brominated, copolymer of an isoolefin and a para-alkylstyrene, an EPDM terpolymer ("EPDM rubber") and/or halobutyl rubber. EPDM rubbers include ethylene/-propylene elastomers with a minor amount, from 2–15% of non-conjugated diene in the terpolymer.

The glossy jet-black surface of the cured sidewall is maintained without impairing the effectiveness of the performance-enhancing ingredients, and in particular, ozone resistance, fatigue crack propagation resistance, and sidewall adhesion to the tire carcass, good heat build-up, and good aging characteristics, which the sidewall composition had without the t-alkanolamine.

In one embodiment, the sidewall compound is a blend of unsaturated polymers such as natural and synthetic rubbers, with polymers of lesser unsaturation, such as EPDM or butyl rubber. Representative of the highly unsaturated polymers which may be employed in the practice of this invention are diene elastomers. Such elastomers will typically possess an iodine number of between about 100 and about 400, although highly unsaturated rubbers having a higher or a lower (i.e., of 50–100) iodine number may also be employed. Illustrative of the diene elastomers which may be utilized are polymers based on conjugated dienes such as 1,3-butadiene; 2-methyl-1,3-buladiene; 1,3-pentadiene: 2 chloro-1,3 butadiene, 2,3-dimethyl-1,3-butadiene; and the like, as well as copolymers of such conjugated dienes with monomers such as styrene, alpha-methylstyrene, acrylonitrile, methacrylonitrile, methyl acrylate, ethyl acrylate, methyl methacrylate, ethyl methacrylate, vinyl acetate and the like. Solution polymerized butadiene styrene copolymers and polypentenamers of the type derived from ring opening polymerization of cyclopentene materials, alternately known as transpolypentene, may also be found useful. Preferred highly unsaturated rubbers include natural rubber, cis-polyisoprene, polybutadiene, poly(styrenebutadiene), polychloroprene and poly(acrylonitrilebutadiene). Moreover, mixtures of two or more highly unsaturated rubbers are preferred.

Mixtures of a highly unsaturated rubber with one having lesser unsaturation such as EPDM (ethylene-propylenediene rubber), EPR (ethylene propylene rubber), butyl or halogenated butyl rubbers having an iodine number below 100 preferably from 10–100, more preferably from 10–50, are preferred.

In another embodiment of the invention the sidewall composition comprises from about 0.1 phr–0.5 phr of a t-alkanolamine and 0.1–3 phr tackifier in combination with conventionally used processing and performance-enhancing ingredients, but no added fatty acids, in combination with two highly unsaturated rubbers, preferably from about 20 to 49 phr of a natural rubber, and from about 51 to about 80 phr of cis-polybutadiene. An additional benefit is that, using the t-alkanolamine in the compound, the surface of a sidewall mold remains unfouled at least three limes longer than when using the compound without the t-alkanolamine.

In still another embodiment, a portion, or all of the cis-polybutadiene may be substituted with a low unsaturation rubber such as, for example, halobutyl rubber, particularly chloro- or bromobutyl rubber, an EPDM, and a halogenated copolymer of an isoolefin and a para-alkylstyrene, wherein the alkylstyrene unit has the structure:

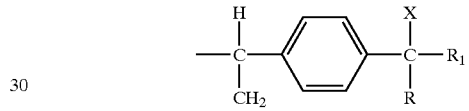

wherein R and R$_1$ are independently selected from the group consisting of hydrogen, C$_1$–C$_5$ alkyl, and primary and secondary alkyl C$_1$–C$_5$ halides, and X is a halogen, preferably bromine or chlorine. Furthermore, the halogenated para-alkylstyrene unit is shown as being pendant from the isoolefin polymer chain, represented by wavy lines in the formula.

Preferred tackifiers include rosin acid type tackifiers such as those obtained from rosin bottoms and disproportionated gum rosin; a tackifier obtained as the residue of distillation of tall oil fails to provide the desired gloss.

Preferred polyalkylene glycols are polyethylene glycol and polypropylene glycol in the stated molecular weight range, polyethylene glycol being most preferred. The amount of glycol added is preferably in the range from about 0.1 to 0.5 phr.

A compounded black rubber sidewall composition of the present invention can be compounded by methods generally known in the rubber compounding art, such as by mixing various fillers with the uncured polymers. The predominant filler is carbon black; other black and non-black fillers and pigments, extenders such as rubber process oils, curing aids such as zinc oxide, sulphur, accelerators or retarders and other additives such as antioxidants, antiozonants antidegradants, and resin(s), are typically added in amounts within ranges conventionally used in the art.

For the purposes of this description, the "compounded" rubber composition refers to a rubber composition which has been compounded with appropriate aforementioned compounding ingredients but no added fatty acids such as stearic acid. It is readily understood by those having skill in the art that the rubber composition of the sidewall would be compounded by methods generally known in the rubber compounding art, such as mixing the various sulfur-vulcanizable constituent rubbers with the various aforementioned commonly used additive materials. As known to those skilled in the art, depending on the intended use of the sulfur vulcanizable rubbers, the additives mentioned above are selected and commonly used in conventional amounts.

The principal advantage derived from incorporating the specified combination of tackifier and t-alkanolamine in a conventional sidewall composition stems from the glossy black appearance of the sidewall when the tire is cured in a conventionally used metal mold in which the portion in contact with the sidewall has a surface finish in the range from 8 RA to 32 RA.

A secondary advantage is that the surface of the mold remains essentially sufficiently free from fouling to produce a gloss in the desired range over an unexpectedly large number of curing cycles, at least 20% more curing cycles than is possible with a conventional sidewall compound without the specified tackifier and t-alkanolamine, requiring no refurbishing of the surface during that period.

Readily available t-alkanolamines suitable for use as reactants in a typical black sidewall compound under curing conditions usually at a temperature in the range from about 150° C. to 200° C. for from about 5 min to 15 min, and elevated pressure in the range from about 1480 kPa (200 psig) to 2860 kPa (400 psig) of a curing press, include for example, triethanolamine; triisopropanolamine; N-methyl diethanolamine; N-ethyl diethanolamine and N,N-dimethyl ethanolamine.

A method for curing a tire with a sidewall having a black high-gloss surface includes fabricating the sidewall with a sidewall compound essentially free of a silanated rubber, the sidewall compound comprising a major amount by weight of cis-polybutadiene and a minor amount of natural rubber to which is added from about 0.05 phr to 0.75 phr of a t-alkanolamine, the alkanol having from 1 to 5 carbon atoms, without adding any fatty acid other than that present in the natural rubber; providing a mold with at least an 8 RA finish for the sidewall; curing the tire at a temperature in the range from about 120° C. to 200° C. at a pressure in the range from about 1480 kPa (200 psig) to 2860 kPa (400 psig) for from 5 min to 15 min.; and, removing a cured tire having a gloss reading in the range from 10 to 40, measured with a 60° Erichsen Pico Glossmeter Model 500.

The following is an illustrative example of a recipe for the novel sidewall compound comprising a blend of two highly unsaturated rubbers, compared to a substantially analogous recipe in which the only different ingredients are the fatty acid, tackifier and triethanolamine; all amounts given refer to parts by weight unless stated otherwise.

| Sidewall Composition | Typical | Black/Glossy |
|---|---|---|
| Non-productive Mix Stage | | |
| Natural Rubber | 40 | 40 |
| Cis 1.4-polybutadiene | 60 | 60 |
| Fatty Acid | 1 | 0 |
| Zinc Oxide | 3 | 3 |
| Processing oil (non-staining) | 12 | 12 |
| Phenolic Tackifier① | 3 | 0 |
| Rosin Acid Tackifier② | 0 | 4 |
| Antidegradants | 4 | 4 |
| Waxes | 1 | 1 |
| Carbon Black | 50 | 50 |
| Triethanolamine | 0.5 | 0.5 |
| Polyethylene glycol | 0 | 0.2 |
| Productive Mix Stage | | |
| Sulfur | 2 | 2 |
| Accelerator | 0.6 | 0.6 |
| Antidegradant | 1 | 1 |

① phenol-formaldehyde resins such as Ribetak® 7572 (Sovereign Chemical Co.); Amberol® SF137 (Rohm & Haas); Schenectady® 1055 (Schenectady International Inc.); and Catalin® 9750 (Catalin Corporation)
② Such as Mobil Rosin 1013 or Sylvatac® from Arizona Chemical Co.

The novel compound prepared with the above ingredients was cured and an ATR-FTIR spectrum of the cured surface was obtained which spectrum is presented in the FIGURE as curve B. For a comparison, the spectra obtained on a compound prepared with the same ingredients but without the triethanolamine and rosin acid type tackifier is presented as curve A. The curve for triethanolamine is labeled C to help assess the curve B. As is evident, the peak attributable to the triethanolamine is no longer present in the cured sample, indicating the triethanolamine is no longer present in that form.

The following is an illustrative example of a recipe for the novel sidewall compound comprising a blend of equal parts by weight of a highly unsaturated rubber and a rubber of lesser unsaturation, using a rosin acid type tackifier, no added fatty acid and triethanolamine; all amounts given refer to parts by weight unless stated otherwise.

| Sidewall composition | Black/Glossy |
|---|---|
| Cis-1,4-polybutadiene | 50 |
| Exxpro ®③ | 50 |
| Carbon Black | 50 |
| Processing Oil | 11 |
| Rosin acid tackifier | 7 |
| Triethanolamine | 0.5 |
| Processing aids | 6 |
| Accelerator | 1.65 |
| Zinc Oxide | 0.8 |
| Sulfur | 0.1 |

③bromimated isobutylene-co-4-methylstyrene copolymer from Exxon Mobil Corp.

What is claimed is:

1. An uncured tire sidewall composition which comprises a blend of at least one highly unsaturated rubber selected from the group consisting of cis-polybutadiene and natural rubber and optionally a less unsaturated rubber, with process- and performance-enhancing ingredients, and a combination of from about 30 phr to 75 phr of reinforcing filler, the major portion by weight of which is carbon black, from about 0.05 to less than 1 phr (part per hundred parts by weight of rubber) of a t-alkanolamine, the alkanol having from 1 to 5 carbon atoms, and from about 0.1 phr to 10 phr of a rosin acid tackifier, the composition when extruded into a strip for a sidewall of a tire, yielding an uncured surface having an 60° Erichsen Pico Glossmeter Model 500 reading of less than 5.

2. The uncured composition of claim 1 including from about 0.1 to 1 phr of a polyalkylene glycol having a molecular weight in the range from about 200 to about 1,000.

3. The uncured composition of claim 2 wherein the blend comprises at least two highly unsaturated rubbers.

4. The uncured composition of claim 2 wherein the highly unsaturated rubber is present in an amount of from about 40 to 60 phr and the less unsaturated rubber is correspondingly present in an amount of from 60 to 40 phr; the tackifier is present in an amount in the range from 3 to 6 phr; and the t-alkanolamine is triethanolamine.

5. The uncured composition of claim 3 wherein the blend comprises cis-polybutadiene and natural rubber and is essentially free of a silanated rubber and fatty acids other than those present in natural rubber.

6. The uncured composition of claim 2 when cured in a curing press against a metal mold having a surface with a finish in the range from 8 RA to 32 RA, yields a cured surface having an 60° Erichsen Pico Glossmeter Model 500 reading in the range from about 10 to 40.

7. A cured tire sidewall compound formed by curing a blend of at least one highly unsaturated rubber selected from the group consisting of cis-polybutadiene and natural rubber, and a halogenated copolymer of an isoolefin and a para-alkylstyrene, with process- and performance-enhancing ingredients including from about 30 phr to 75 phr of reinforcing filler, the major portion by weight of which is carbon black, from about 0.1 phr to 10 phr of a rosin acid type tackifier, and a reaction product of from about 0.05 to less than 1 phr (part per hundred parts by weight of rubber) of a t-alkanolamine, the alkanol having from 1 to 5 carbon atoms, with one or more of the ingredients; the sidewall having a surface which provides a gloss reading in the range from 10 to 40, measured with a 60° Erichsen Pico Glossmeter Model 500, when cured in a curing press against a metal mold having a surface with a finish in the range from 8 RA to 32 RA, and the reading is not substantially diminished for at least four weeks outdoors or three months indoors.

8. The cured sidewall compound of claim 7 wherein the blend includes from about 0.1 to 1 phr of a polyalkylene glycol having a molecular weight in the range from about 200 to about 1,000.

9. The cured sidewall compound of claim 8 wherein the blend comprises at least two highly unsaturated rubbers.

10. The cured sidewall compound of claim 7 wherein the highly unsaturated rubber is present in an amount of from about 40 to 60 phr and the less unsaturated rubber is correspondingly present in an amount of from 60 to 40 phr; and the t-alkanolamine is triethanolamine.

11. The cured sidewall compound of claim 8 wherein the blend comprises cis-polybutadiene and natural rubber and is essentially free of a silanated rubber and fatty acids other than those present in natural rubber.

12. A method for curing a tire with a sidewall having a black high-gloss surface comprising, fabricating the sidewall with a sidewall compound essentially free of a silanated rubber, the sidewall compound comprising from about 30 phr to 75 phr of reinforcing filler, the major portion by weight of which is carbon black, from about 0.1 phr to 10 phr of a rosin acid type tackifier, a major amount by weight of cis-polybutadiene and a minor amount of natural rubber relative to the other rubbers, to which is added from about 0.05 phr to 0.75 phr of a t-alkanolamine, the alkanol having from 1 to 5 carbon atoms, without adding any fatty acid other than that present in the natural rubber;

providing a mold with at least an 8 RA finish for the sidewall;

curing the tire at a temperature in the range from about 120° C. to 200° C. at a pressure in the range from about 1480 kPa (200 psig) to 2860 kPa (400 psig) for from 5 min to 15 min.; and, removing a cured tire having a gloss reading in the range from 1 to 40, measured with a 60° Erichsen Pico Glossmeter Model 500.

13. The method of claim 12 wherein the sidewall compound includes from about 0.1 to 1 phr of a polyalkylene glycol having a molecular weight in the range from about 200 to about 1,000.

* * * * *